(12) United States Patent
Matsumura

(10) Patent No.: US 9,860,470 B2
(45) Date of Patent: Jan. 2, 2018

(54) IMAGE CAPTURING APPARATUS CAPABLE OF GENERATING AND ADDING PIXEL REGION INFORMATION TO IMAGE DATA, METHOD OF CONTROLLING THE SAME, AND IMAGE SENSOR

(71) Applicant: CANON KABUSHIKI KAISHA, Tokyo (JP)

(72) Inventor: Koichi Matsumura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/837,864

(22) Filed: Aug. 27, 2015

(65) Prior Publication Data

US 2016/0065874 A1 Mar. 3, 2016

(30) Foreign Application Priority Data

Sep. 2, 2014 (JP) .................................. 2014-178508
Aug. 11, 2015 (JP) .................................. 2015-159137

(51) Int. Cl.
*H04N 3/14* (2006.01)
*H04N 5/225* (2006.01)
*H04N 5/378* (2011.01)
*H04N 5/361* (2011.01)

(52) U.S. Cl.
CPC ............. *H04N 5/378* (2013.01); *H04N 5/361* (2013.01)

(58) Field of Classification Search
CPC ....................................................... H04N 5/378
USPC ............................................... 348/294, 231.3
See application file for complete search history.

(56) References Cited

U.S. PATENT DOCUMENTS 8,970,750 B2 * 3/2015 Sugioka ................ G06T 1/0007
348/294
2010/0225790 A1 * 9/2010 Sasaki ....................... G06T 5/50
348/241

FOREIGN PATENT DOCUMENTS

JP 2012-120158 A 6/2012

* cited by examiner

*Primary Examiner* — Joel Fosselman
(74) *Attorney, Agent, or Firm* — Cowan, Liebowitz & Latman, P.C.

(57) ABSTRACT

An image capturing apparatus, comprising: a pixel portion comprising a first pixel region and a second pixel region; an output unit configured to output a result of adding region information indicating the first pixel region and the second pixel region to image data obtained from the pixel portion; and a signal processing unit configured to correct pixel data of the first pixel region using pixel data of the second pixel region for image data read out from the pixel portion, wherein the signal processing unit extracts pixel data of the first pixel region and pixel data of the second pixel region of the image data using the region information added to the image data received from the output unit.

19 Claims, 14 Drawing Sheets

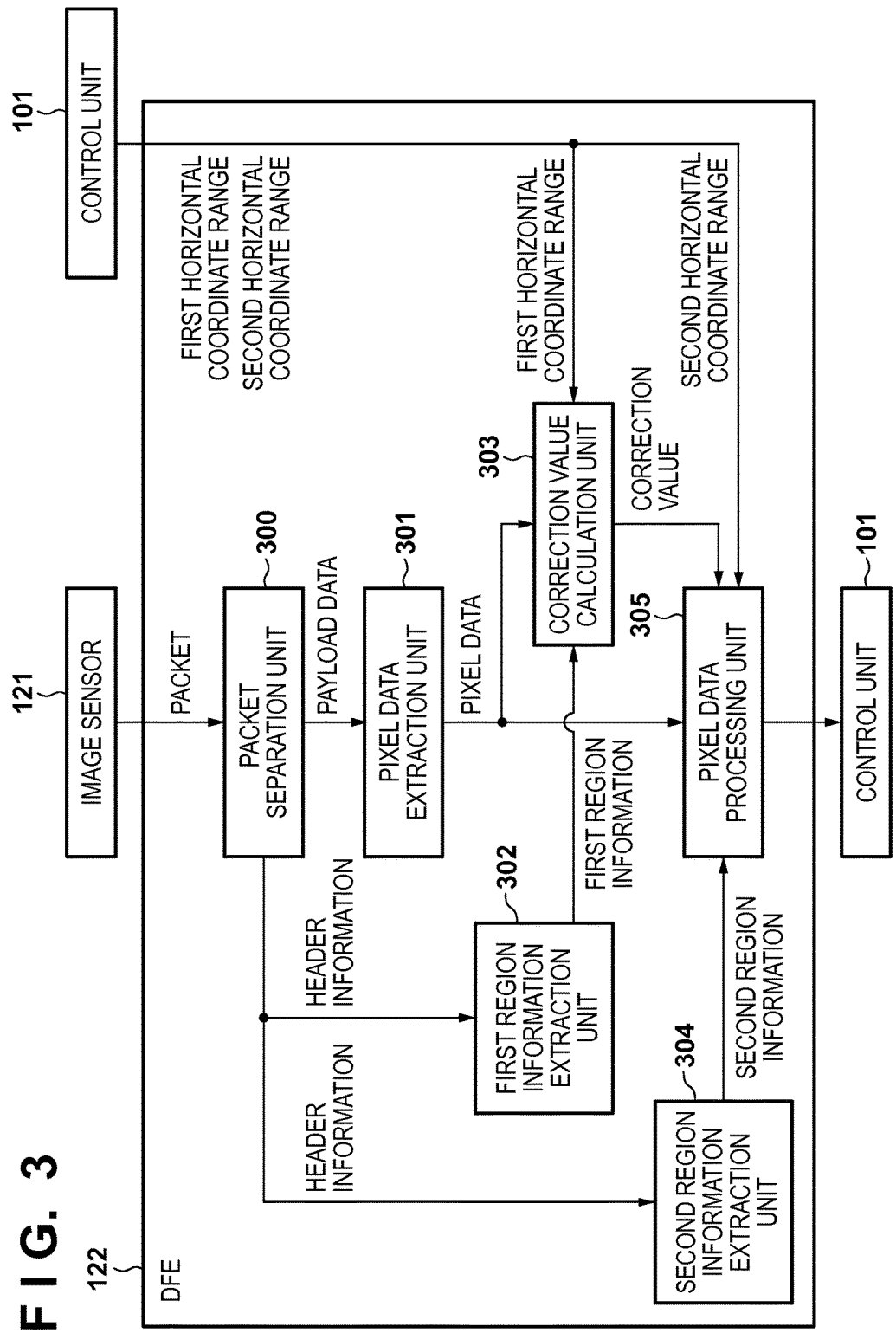

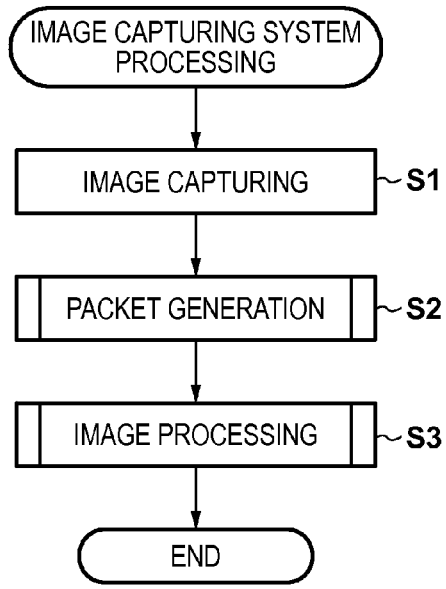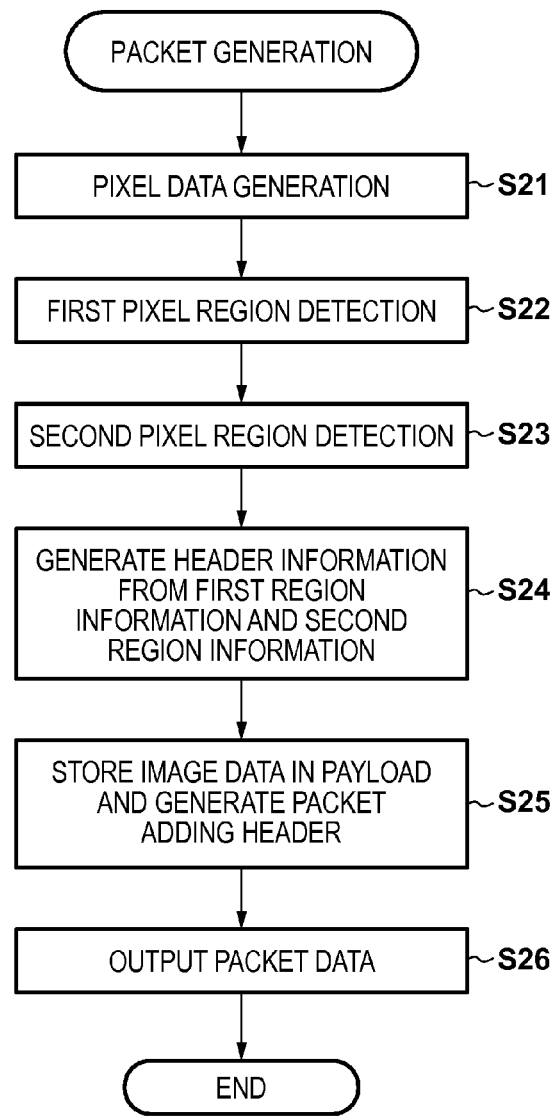

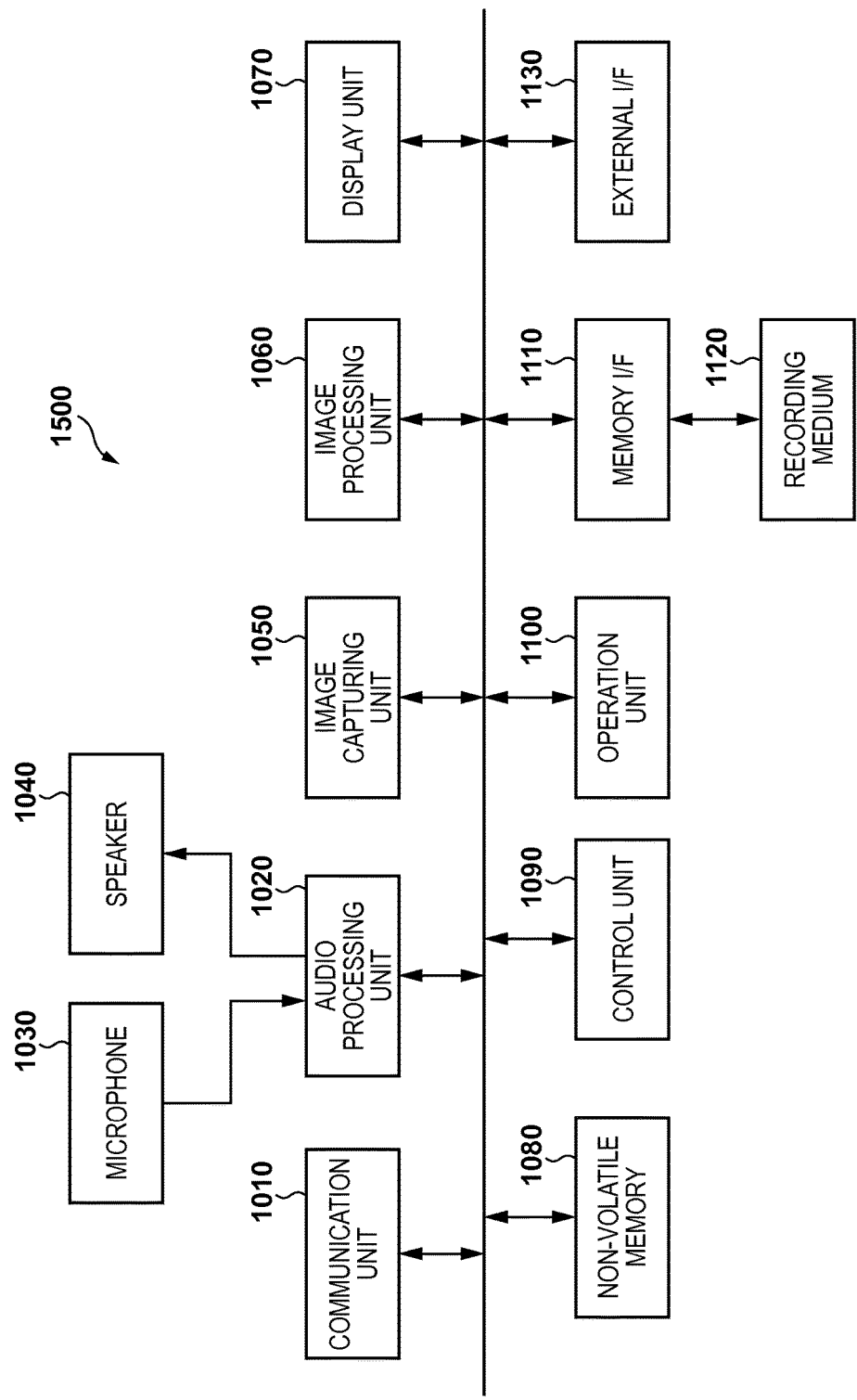

IMAGE CAPTURING APPARATUS CAPABLE OF GENERATING AND ADDING PIXEL REGION INFORMATION TO IMAGE DATA, METHOD OF CONTROLLING THE SAME, AND IMAGE SENSOR

BACKGROUND OF THE INVENTION

Field of the Invention

The present invention relates to an image capturing apparatus, a method of controlling the same, and an image sensor.

Description of the Related Art

In recent years, in conjunction with an increase in pixels in image sensors, and optimization of speeds for reading out from image sensors, a required transmission capacity between an image sensor and a circuit (DSP, Digital Signal Processor) for signal processing connected thereto is increasing. In response to such a requirement, Japanese Patent Laid-Open No. 2012-120158 discloses a technique for optimizing data transmission/reception between circuits by transmitting packets divided into a plurality of transmission channels in transmission/reception of data between an image sensor and a DSP.

However, in an image capturing system having an image sensor, a circuit for signal processing, and a control unit (for example, a CPU), it is necessary to transfer control information (for example, coordinate information) to each circuit from the control unit. In particular, because the circuit for signal processing processes image data in accordance with a size of an image output from the image sensor, when the image size of the image data output from the image sensor is changed, it is necessary for the circuit for signal processing to receive control information such as coordinate information from the control unit. Additionally, when there is a pixel of an optical black area for which the image sensor is light-shielded, for example, and the circuit for signal processing corrects pixel data of an effective pixel region using pixel data of that region, it is necessary for the circuit to receive coordinate information for the above-described two regions from the control unit. Because at this time the control unit transmits similar control information for the image sensor and the circuit for signal processing, it is envisioned that the system will become more complicated because, accompanying the increase in processing performed by the circuit for signal processing, the control information respectively transmitted from the control unit will increase.

SUMMARY OF THE INVENTION

The present invention has been made in consideration of the aforementioned problems, and realizes a technique that provides an image capturing apparatus, a method of controlling the same, and an image sensor capable of reducing control information transmitted from a control unit to a circuit for signal processing.

In order to solve the aforementioned problems, the present invention provides an image capturing apparatus, comprising: a pixel portion comprising a first pixel region and a second pixel region; an output unit configured to output a result of adding region information indicating the first pixel region and the second pixel region to image data obtained from the pixel portion; and a signal processing unit configured to correct pixel data of the first pixel region using pixel data of the second pixel region for image data read out from the pixel portion, wherein the signal processing unit extracts pixel data of the first pixel region and pixel data of the second pixel region of the image data using the region information added to the image data received from the output unit.

In order to solve the aforementioned problems, the present invention provides an image sensor comprising: a pixel portion comprising a first pixel region and a second pixel region; and an output unit configured to output a result of adding region information indicating the first pixel region and the second pixel region to image data obtained from the pixel portion.

In order to solve the aforementioned problems, the present invention provides a control method of an image capturing apparatus in which a pixel portion has a first pixel region and a second pixel region, the method having: an output step of outputting a result of adding region information indicating the first pixel region and the second pixel region to image data obtained from the pixel portion; and a signal processing step of correcting pixel data of the first pixel region using pixel data of the second pixel region for image data read out from the pixel portion, wherein in the signal processing step, pixel data of the first pixel region and pixel data of the second pixel region of the image data is extracted using the region information added to the image data received in the output step.

According to the present invention, it becomes possible to reduce control information transmitted from a control unit to a circuit for signal processing.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a block diagram for showing a functional configuration example of a DFE according to embodiments.

FIG. 4 is a flowchart for showing a series of operations of processing of an image capturing system according to embodiments.

FIG. 5 is a flowchart for showing a series of operations of packet generation processing according to a first embodiment.

FIG. 15 is a block diagram for showing a functional configuration example of a mobile telephone which is an example of the image capturing apparatus in accordance with other embodiments.

DESCRIPTION OF THE EMBODIMENTS

First Embodiment

Exemplary embodiments of the present invention will be described hereinafter in detail, with reference to the accompanying drawings. Note that explanation is given below of examples in which the present invention is applied to a digital camera having an image sensor, a circuit for signal processing, and a control unit, which are connected to each other, as an example of an image capturing apparatus. However, the image capturing apparatus in the present invention is not limited to the digital camera, and can be applied to any electronic device having such a configuration of an image sensor, etc. The electronic device may include mobile telephones, game devices, tablet terminals, personal computers, clock-type or glasses-type information terminals, or the like, for example.

(Configuration of a Digital Camera 100)

Figure 1:
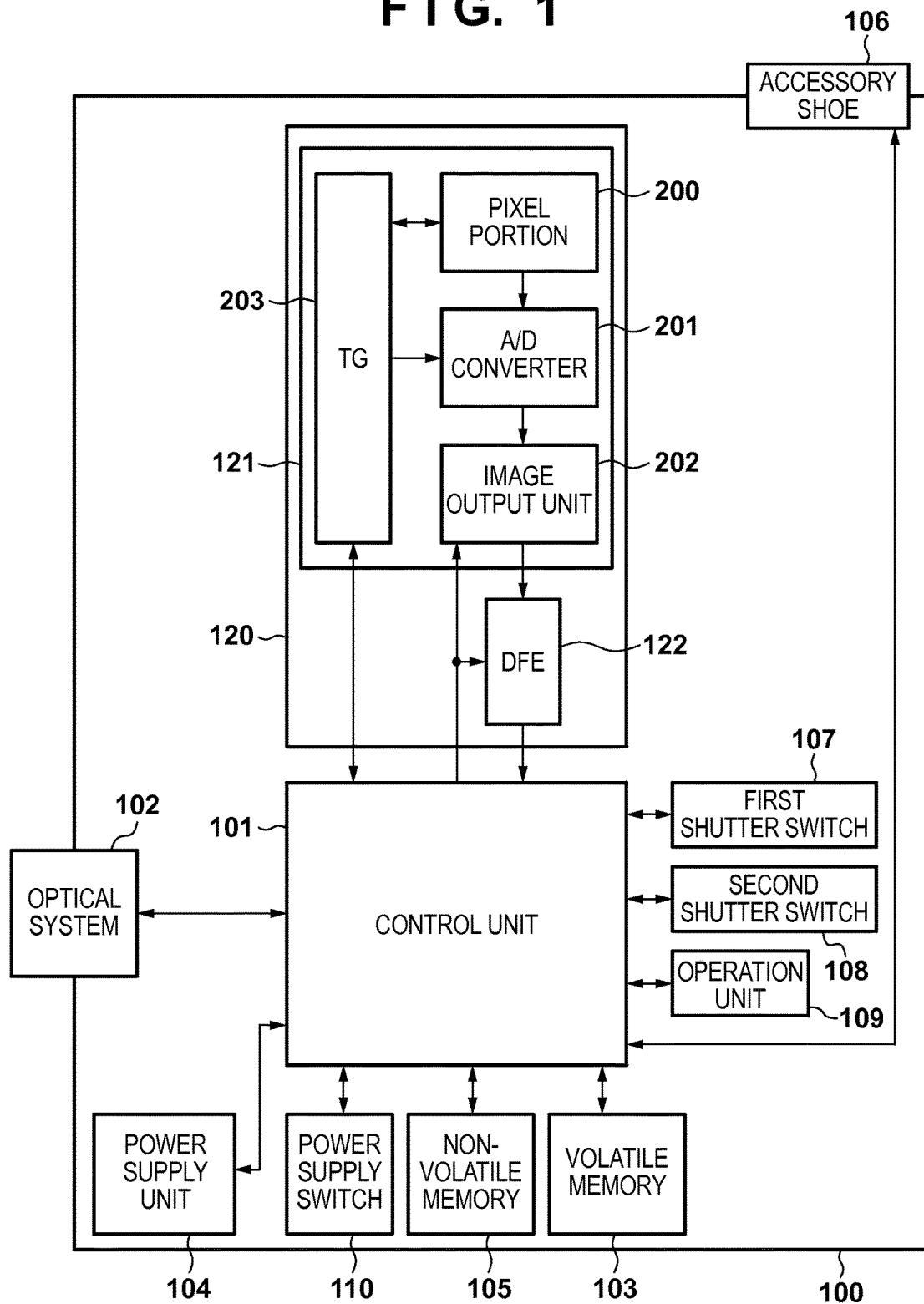
FIG. 1 is a block diagram for showing a functional configuration example of a digital camera as an example of an image capturing apparatus according to embodiments of the present invention.

FIG. 1 is a block diagram for showing a functional configuration example of a digital camera 100 which is an example of the image capturing apparatus of the present embodiment. Note that, one or more of the functional blocks shown in FIG. 1 may be realized by hardware such as an ASIC, a programmable logic array (PLA), or the like, and may be realized by a programmable processor such as a CPU, an MPU, or the like, executing software. Also, these may be realized by a combination of software and hardware. Accordingly, in the following explanation, even in a case where different functional blocks are recited as the subject of operations, it is possible that this may be realized by the same hardware as the subject.

In signals output from pixels of an image sensor, generally, a dark current that occurs due to an influence of heat, or the like, is included even in a case of light-shielding. For this reason, in order to obtain a signal (a reference signal for black level) which is a signal level reference signal, the image sensor is provided with an optical black pixel region (an OB pixel region) that is light-shielded so not to react to light, and the image sensor performs computational processing for a signal of an effective pixel based on the reference signal for black level obtained from pixels of this OB pixel region. For example, an OB pixel region is arranged at an upper portion of an effective pixel region on the image sensor, and by calculating a correction value from the output of these OB pixels, it is possible to correct a shading in a horizontal direction due to an influence of a dark current for a signal output from a pixel of the effective pixel region. In embodiments, explanation will be given for an example in which correction processing corresponding to a dark current is performed as an example of image processing that the DSP performs. In other words, explanation is given for an example in which an image sensor outputs signals of both an effective pixel region and an OB pixel region and performs correction processing corresponding to a dark current on a signal that a DSP inputs.

An image capturing unit 120 includes an image sensor 121 and a DFE (Digital Front End) 122. The image sensor 121 includes a pixel portion 200, an A/D converter 201, an image output unit 202, and a timing generator (TG) 203 as will be explained later in FIG. 2A. The image sensor 121 generates image data from an optical image of an object formed by an optical system 102 and outputs it to the DFE 122.

The DFE 122 is a processor for signal processing (a DSP) which performs image processing on image data that the image sensor 121 outputs, and the DFE 122 outputs image data to a control unit 101 after applying image processing to it.

The control unit 101 includes a CPU or an MPU, for example, and controls the digital camera 100 on the whole by loading a program stored in a non-volatile memory 105 into a work area of a volatile memory 103, and executing the program. The control unit 101 controls units such as the image sensor 121, the optical system 102, and the DFE 122 in order to perform an image capturing operation in accordance with an image capturing condition set by a user. Also, as will be explained later, the control unit 101 instructs the image sensor 121 of a region of pixels for which to read out a signal from the pixel portion 200.

The optical system 102 is connected electronically to the digital camera 100; the optical system 102 takes in external light, and includes a focusing lens, a zoom lens, an aperture, a shutter, or the like, for forming an image on an image capturing surface of the pixel portion 200.

The volatile memory 103 is a main storage apparatus such as a RAM which stores temporary data that may disappear after a power supply of the digital camera 100 is cut. The volatile memory 103 is connected to the control unit 101, and holds data provided from the control unit 101 in accordance with an instruction by the control unit 101.

A power supply unit 104 supplies power to the digital camera 100. A power supply destination is not limited to the control unit 101 shown in FIG. 1, and power may be supplied to each unit comprising in the digital camera 100.

The non-volatile memory 105 is an auxiliary storage apparatus comprised of a semiconductor memory, a magnetic disk, or the like, and in addition to storing images and video that are captured, the non-volatile memory 105 stores information that must be held even after the power supply is cut, such as a Tv value, an Av value, or the like, set for the digital camera 100. The non-volatile memory 105 is connected to the control unit 101, and stores data provided from the control unit 101 in accordance with an instruction by the control unit 101.

An accessory shoe 106 is arranged on the upper portion of the digital camera 100, and is a set of metal connectors that can connect with a clip-on type flash.

A first shutter switch 107 is turned on and generates a first shutter switch signal SW1 in the middle of an operation on a shutter release button arranged on the digital camera 100, which is a so-called a half-press (a shooting preparation instruction). The control unit 101 starts an operation of AF (auto focus) processing, AE (auto exposure), AWB (auto white balance), or the like, upon the first shutter switch signal SW1.

A second shutter switch 108 is turned on and generates a second shutter switch signal SW2 upon completion of an operation on the shutter release button, which is a so-called full-press (an image capturing instruction). The control unit 101 starts an operation of a series of image capturing processes, from when a signal is read from the image capturing unit 120 until when image data is written to the non-volatile memory 105, upon the second shutter switch signal SW2.

An operation unit 109 has buttons, dials, a touch panel, or the like, for setting setting values such as the Av value or the Tv value which are set for the digital camera 100. The operation unit 109 communicates operation content or setting values to the control unit 101 when a user operation is detected. Various settings values set by user operation are stored in the non-volatile memory 105 based on instructions of the control unit 101, as described above.

A power supply switch 110 is a mechanical switch for switching a power supply state of the digital camera 100 on and off. When a on or off switching operation by a user is detected, a supply of power to units of the digital camera 100 from the power supply unit 104 is started or stopped.

(Configuration of the Image Sensor 121)

Figure 2A:
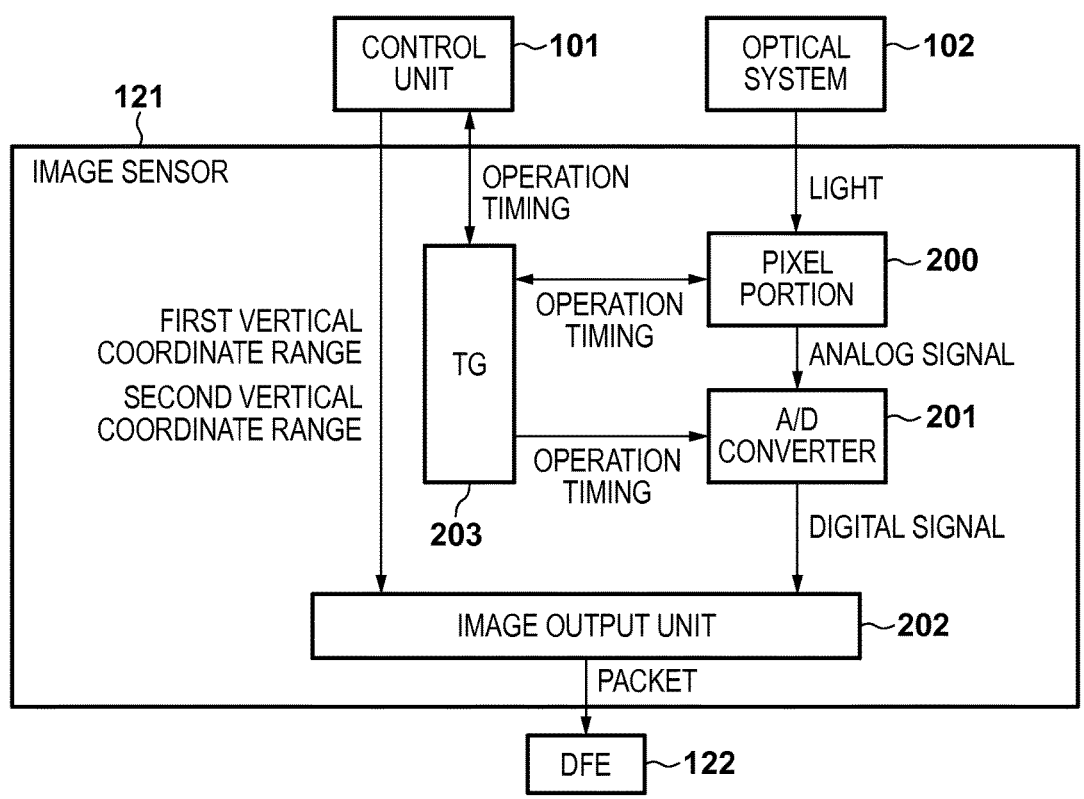
FIG. 2A is a block diagram for showing a functional configuration example of an image sensor according to embodiments.

Next, explanation is given for a configuration of the image sensor 121 shown in FIG. 1 with reference to FIG. 2A.

The image sensor 121 receives an optical image of an object which is formed by the optical system 102 in a plurality of pixels arranged two-dimensionally, and the image sensor 121 photoelectrically converts each pixel and outputs an analog signal. The image sensor 121 may be an image sensor such as a CCD (Charge-Coupled Device) image sensor, a CMOS (Complementary Metal Oxide Semiconductor) image sensor, or the like. The pixel portion 200 of the image sensor 121 outputs an analog signal in accordance with a timing signal supplied by the timing generator 203.

The A/D converter 201 converts an analog signal output by the pixel portion 200 into a digital signal in accordance with operation timing generated by the timing generator 203.

The image output unit 202 adds header information to the digital signal input from the A/D converter 201 based on control information obtained from the control unit 101, and outputs image data including the header information. More specifically, the image output unit 202 obtains the control information, i.e. a later explained first and second vertical coordinate range, from the control unit 101, and generates header information based on the vertical coordinate range. The image output unit 202 divides digitized pixel data by a predetermined data length when image data is output, and performs a packetization adding header information generated for this data. The image output unit 202 outputs the packetized data to the DFE 122 as image data.

The timing generator 203 supplies an operation timing to the pixel portion 200 and the A/D converter in accordance with operation timing information input from the control unit 101.

(Configuration of an Image Output Unit 202)

Figure 2B:
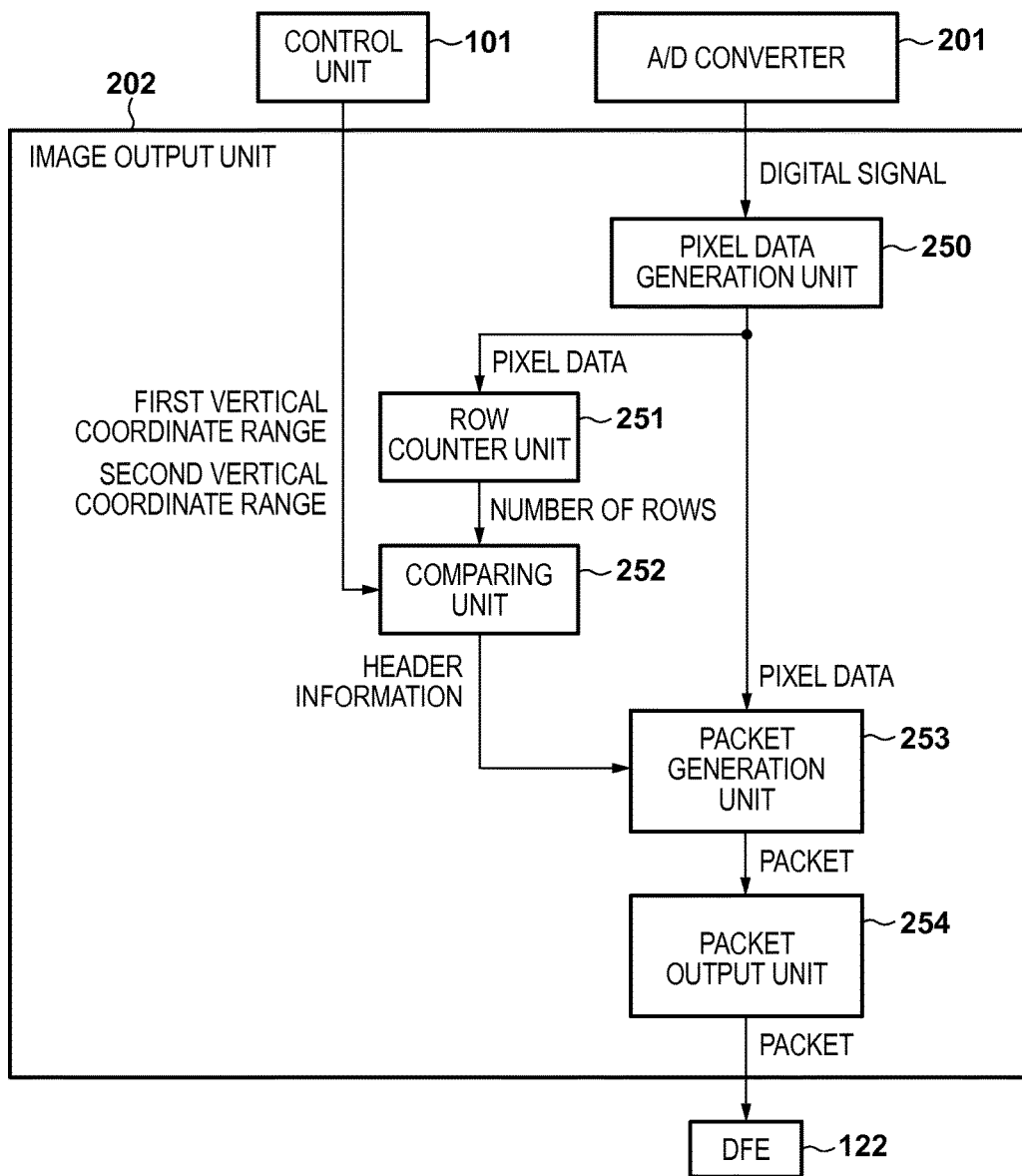
FIG. 2B is a block diagram for showing an image output unit according to embodiments.

Further detailed explanation is given for a configuration of the image output unit 202 shown in FIG. 2A with reference to FIG. 2B.

A pixel data generation unit 250 inputs a digital signal that the A/D converter 201 outputs and converts the digital signal into pixel data. The pixel data generation unit 250 generates pixel data such that data is formed for each pixel in an RGB format in which the input digital signal is separated into R (red), G (green), and B (blue) color components, for example.

A row counter unit 251 inputs pixel data that the pixel data generation unit 250 outputs, counts a number of rows of pixels by counting a number of rows (a number of pixel lines) in units of a predetermined number of pixels, and outputs the counted value of the number of rows to a comparing unit 252.

Figure 8:
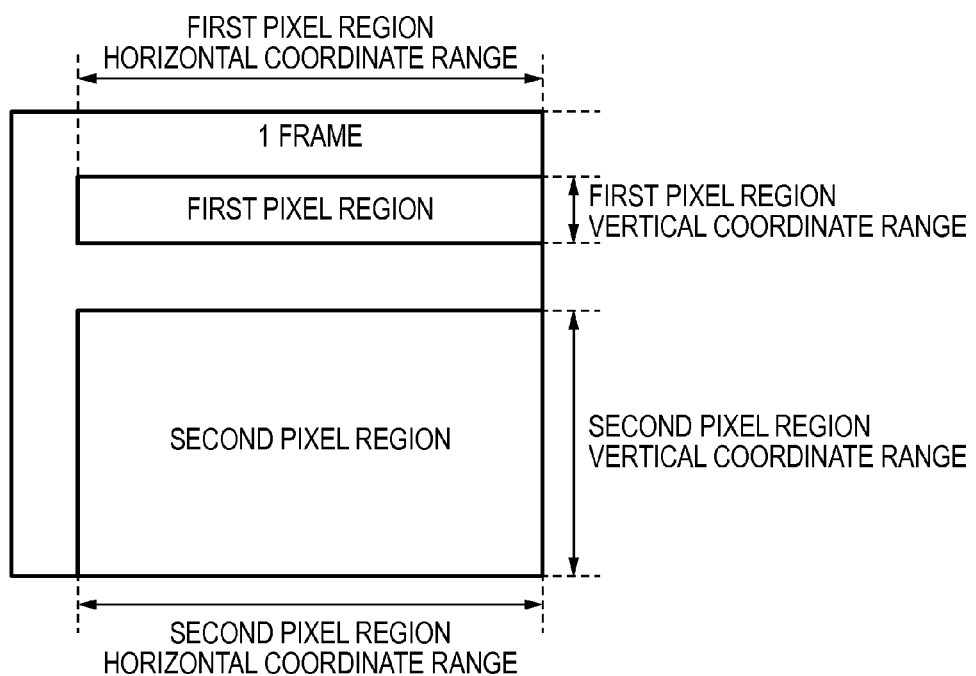
FIG. 8 is a view for illustrating an example configuration of pixel regions in a pixel portion according to the first embodiment.

The comparing unit 252 inputs a value of the number of rows from the row counter unit 251, and compares the value of the number of rows for a vertical coordinate range of a first pixel region (for example, an OB pixel region that is light-shielded) input from the control unit 101, and a vertical coordinate range of a second pixel region (for example, an effective pixel region). The comparing unit 252 determines whether or not pixel data are included in the first pixel region or the second pixel region by this comparison, and generates data, as header information, that indicates whether or not pixel data is included in the first pixel region or the second pixel region in an image shown in FIG. 8. In embodiments, data indicating whether or not pixel data is included in the first pixel region or the second pixel region is referred to as first region information and second region information respectively.

A packet generation unit 253 generates packets based on pixel data output from the pixel data generation unit 250 and header information output from the comparing unit 252. The packet generation unit 253 stores pixel data output from the pixel data generation unit 250 in a packet payload, and generates a packet further adding header information output from the comparing unit 252 to the payload.

A packet output unit 254 outputs packets generated by the packet generation unit 253 adapting to a transmission method corresponding to a transmission channel (not shown) that connects image sensor 121 and the DFE 122.

(Configuration of the DFE 122)

FIG. 3 illustrates a detailed functional configuration example of the DFE 122.

A packet separation unit 300 separates the header information and the payload data included in the input packet.

A pixel data extraction unit 301 extracts pixel data from payload data separated from a packet by the packet separation unit 300.

A first region information extraction unit 302 extracts first region information based on the header information separated from the packet by the packet separation unit 300 and outputs it to a correction value calculation unit 303.

The correction value calculation unit 303 determines whether or not pixel data inputted from the pixel data extraction unit 301 is included in the first pixel region based on the first region information that the first region information extraction unit 302 extracted. Then, when it is determined that the pixel data is included in the first pixel region, a correction value for correcting an influence of dark current is calculated based on an average value of pixel data. The correction value that is calculated is output to a pixel data processing unit 305. Note that in embodiments various variations and changes can be made in accordance with objectives, and while explanation was given for an example in which the correction value for correcting the influence of dark current is calculated using an average value of pixel data, limitation is not made to calculating using an average value.

A second region information extraction unit 304 extracts second region information from header information separated from a packet by the packet separation unit 300, and outputs it to the pixel data processing unit 305.

The pixel data processing unit 305 determines whether pixel data input from the pixel data extraction unit 301 is included in the second pixel region based on the second region information that the second region information extraction unit 304 extracted. Then, subtraction processing of the correction value that the correction value calculation unit 303 calculates is performed on the pixel data determined to be included in the second pixel region, and the influence of dark current included in the pixel data is corrected. The pixel data processing unit 305 outputs the post-correction image data to the control unit 101 when the correction processing completes.

(Series of Operations for Image Capturing Processing)

Next, with reference to FIG. 4, explanation is given for a series of operations for image capturing processing by the image capturing unit 120. This processing is started when an image capturing instruction from a user on the second shutter switch 108 of the digital camera 100, for example, is detected. Note that each step corresponding to this processing is executed in accordance with an instruction of the control unit 101, and is realized by the control unit 101 loading a program stored in the non-volatile memory 105 in a work area of the volatile memory 103, and executing the program.

In step S1, the image capturing unit 120 performs image capturing. The control unit 101 performs control for driving of an aperture, control of an exposure time, and the like for the optical system 102, for example, and causes the pixel portion 200 to be exposed by an appropriate exposure amount. An analog signal read out from the pixel portion 200, as described above, is converted into a digital signal, and thereby pixel data is generated.

Figure 7:
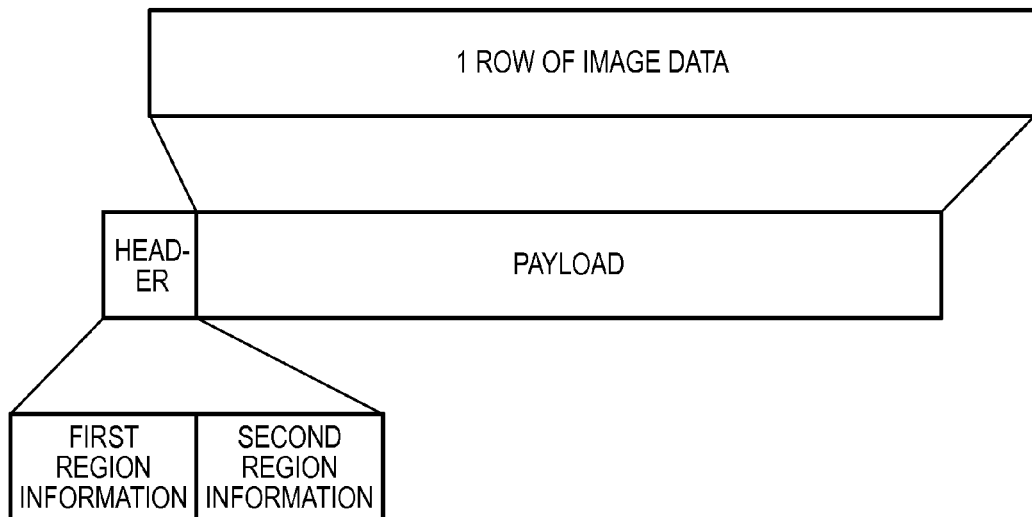
FIG. 7 is a view for illustrating an example of a packet format according to the first embodiment.

In step S2, the image output unit 202 generates a packet into which image data is divided. FIG. 7 illustrates a format of the packet that the image output unit 202 generates. The packet comprises a header and a payload. In one row of pixel data stored in the payload, pixel data output from pixels of the OB pixel region or pixel data output from pixels of the effective pixel region is stored. In the header information, information indicating whether the pixel data stored in the payload is pixel data output from pixels of the first pixel region or the second pixel region is added. The image output unit 202 divides the image data into rows of pixel data, and in addition to storing a row of pixel data in the payload, the image output unit 202 adds header information, thereby generating a packet. Packet generation processing will be explained later separately with reference to a flowchart shown in FIG. 5. The image output unit 202 outputs the generated packet to the DFE 122 via a transmission channel (not shown).

In step S3, the DFE 122 performs image processing on the image data input from the image sensor 121. The DFE 122 separates the inputted packet data into the payload storing the pixel data and the header storing first region information and second region information, and performs image processing on the pixel data, i.e. the DFE 122 performs correction for removing the influence of dark current. Details of image processing will be explained later with reference to a flowchart shown in FIG. 6. When the DFE 122 outputs the post-correction image data to the control unit 101, the control unit 101 completes the series of operations for this processing.

(Series of Operations for Packet Generation Processing)

With reference to the flowchart shown in FIG. 5 explanation will be given for a series of operations for the packet generation processing shown as step S2 in FIG. 4.

In step S21, the pixel data generation unit 250 inputs a digital signal output by the A/D converter, generates pixel data in an RGB format as described above, for example, and outputs sequentially each pixel as data. For the generated pixel data, a number of rows is counted by the row counter unit 251 where one row is made to be a predetermined number of pixels.

In step S22, the comparing unit 252 compares the number of rows that the row counter unit 251 generates (i.e. a vertical coordinate of the pixel data) and a vertical coordinate range of the first pixel region input from the control unit 101, and determines if the vertical coordinate of the pixel data is included in the first pixel region. The comparing unit 252 updates the first region information if it is determined that pixel data to be processed (i.e. the number of rows input) is included in the vertical coordinate range of the first pixel region. The first region information is a binary identifier for which an initial value is set to be 0, for example, and the first the region information is set to 1 if the pixel data is included in the vertical coordinate range of the first pixel region, and set to 0 if the pixel data is not included in the range.

In step S23, the comparing unit 252 compares the number of rows that the row counter unit 251 generated and the vertical coordinate range of the second pixel region input from the control unit 101, and determines whether a vertical coordinate of the pixel data is included in the second pixel region. The comparing unit 252 updates the second region information if it is determined that the pixel data to be processed is included in the vertical coordinate range of the second pixel region. The second region information is set similarly to the above described first region information.

In step S24, the comparing unit 252 generates header information comprising the first region information and the second region information.

In step S25, the packet generation unit 253 generates a packet based on payload data including pixel data and the header information generated by the comparing unit 252.

In step S26, the packet output unit 254 outputs the packet generated in step S25 to the DFE 122. The packet output unit 254 repeatedly transmits a packet for each row, and when the transmission of the packets completes for all of the image data, the series of operations for this processing completes.

(Series of Operations for Image Processing)

Next, with reference to the flowchart shown in FIG. 6, explanation will be given for image processing shown as step S3 in FIG. 4.

When, in step S300, the DFE 122 inputs a packet transferred from the image sensor 121, the packet separation unit 300 of the DFE 122, in step S301, separates the header information and the payload data.

In step S302, the pixel data extraction unit 301 extracts pixel data included in the payload.

In step S303, the first region information extraction unit 302 extracts first region information included in the header information separated in step S301, and outputs to the correction value calculation unit 303.

In step S304, the correction value calculation unit 303, based on the extracted first region information, determines if a vertical coordinate of the pixel data extracted from the payload in step S302 is included in the first vertical region. The correction value calculation unit 303 determines that the pixel data is included in the first vertical region and advances the processing to step S305 when the first region information indicates 1, and the correction value calculation unit 303 determines that the pixel data is not included in the first vertical region and advances the processing to step S307 when the first region information indicates 0.

In step S305, the correction value calculation unit 303 compares a horizontal coordinate of pixel data obtained by counting pixel data of the payload with a first horizontal coordinate range input from the control unit 101, and determines if a horizontal coordinate of the pixel data is included in the first horizontal coordinate range. When a horizontal coordinate of the pixel data is determined to be included in the first horizontal coordinate range, the processing proceeds to step S306, and when it is determined that the horizontal coordinate is not included in the range, the processing advances to step S307.

In step S306, the correction value calculation unit 303 calculates an average value of all of the pixel data of the first pixel region included in the first horizontal coordinate range, and generates a correction value for the image.

In step S307, the second region information extraction unit 304 extracts second region information included in the header information.

In step S308, the pixel data processing unit 305 determines, similarly to in step S304, whether a vertical coordinate of pixel data is included in the second vertical region from the extracted second region information, and when it is determined that the pixel data is included in the second vertical region, the processing advances to step S309.

In step S309, the pixel data processing unit 305 compares horizontal coordinate information that the correction value calculation unit 303 indicates with the second horizontal coordinate range input from the control unit 101. When it is determined that a horizontal coordinate of the pixel data is included in the horizontal coordinate range that is input, the processing advances to step S310.

In step S310, the pixel data processing unit 305 performs subtraction processing of the correction value calculated in step S306 on a pixel specified in the second region information. If the pixel data processing unit 305 completes correction processing on a pixel specified by the second region information, the series of operations for the image processing completes.

Note that in embodiments, configuration is such that pixel data is stored in a packet for each row, and such that the control unit 101 transmits a vertical coordinate range to the image output unit 202, but configuration may be taken such that pixel data is stored in a packet for each column, and such that a horizontal coordinate range is transmitted from the control unit 101. In such a case, the row counter unit 251 may count pixel data items for each column, and the comparing unit 252 may determine whether the counter value is included in the horizontal coordinate range.

Also, an example of correction processing is described in present embodiments in which processing for subtracting a correction value from pixel data included in the second pixel region was performed, but the correction processing is not limited to subtraction processing, and various variations and changes can be made in accordance with objectives.

As explained above, in embodiments, configuration is taken such that the image sensor 121 inputs vertical coordinate information of pixel data, and the image sensor 121 supplies the vertical coordinate information of the pixel data in addition to the pixel data in a centralized fashion. With such a configuration, it is possible for the DFE 122, which is a circuit for signal processing, to perform image processing without receiving information relating to a vertical coordinate from the control unit 101. Accordingly, it is possible to reduce control information transmitted from the control unit to the circuit for signal processing.

Second Embodiment

Next, explanation will be given for a second embodiment. In embodiments, explanation is given for processing for correcting shading in a vertical direction due to an influence of dark current as an example of image processing that the DFE 122 performs. For the digital camera 100 of the present embodiment, a configuration of pixels of an image sensor, and image processing that is applied differs from the first embodiment; other than this the configuration is the same as in the first embodiment. For these reasons, the same reference numerals are given to the same elements, and overlapping explanation is omitted, and predominantly explanation is given for differences.

Figure 10:
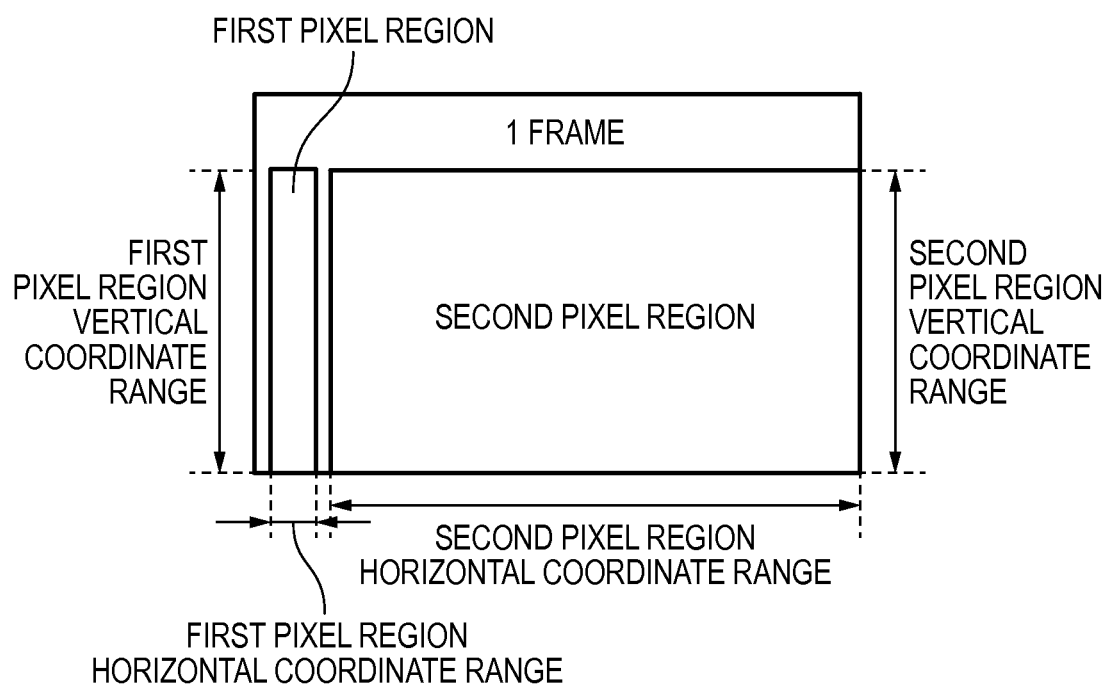
FIG. 10 is a view for illustrating an example configuration of pixel regions in a pixel portion according to the second embodiment.

As is shown in FIG. 10, the pixel portion 200 according to embodiments comprises an OB pixel region which is adjacent to an effective pixel region in a horizontal direction. Pixels of the OB pixel region arranged in a horizontal direction from the effective pixel region are input into the DFE 122, and the DFE 122 in addition to calculating a correction value using an output of the pixels of the OB pixel region performs correction processing on the effective pixel region. With such a configuration, shading in a vertical direction due to an influence of dark current is corrected.

The OB pixel region (a first pixel region) and the effective pixel region (a second pixel region) are arranged so as to be adjacent in a horizontal direction. Pixels included in the first pixel region are specified by a vertical coordinate range of the first pixel region and a horizontal coordinate range of the first pixel region which indicate a vertical direction coordinate range and a horizontal direction coordinate range. Similarly, pixels included in the second pixel region are specified by a vertical coordinate range in the second pixel region and a horizontal coordinate range in the second pixel region.

A series of operations for image processing according to embodiments will be explained with reference to a flowchart shown in FIG. 9. Note that in FIG. 9 processing that is the same as in FIG. 6 is given the same step number.

Figure 6:
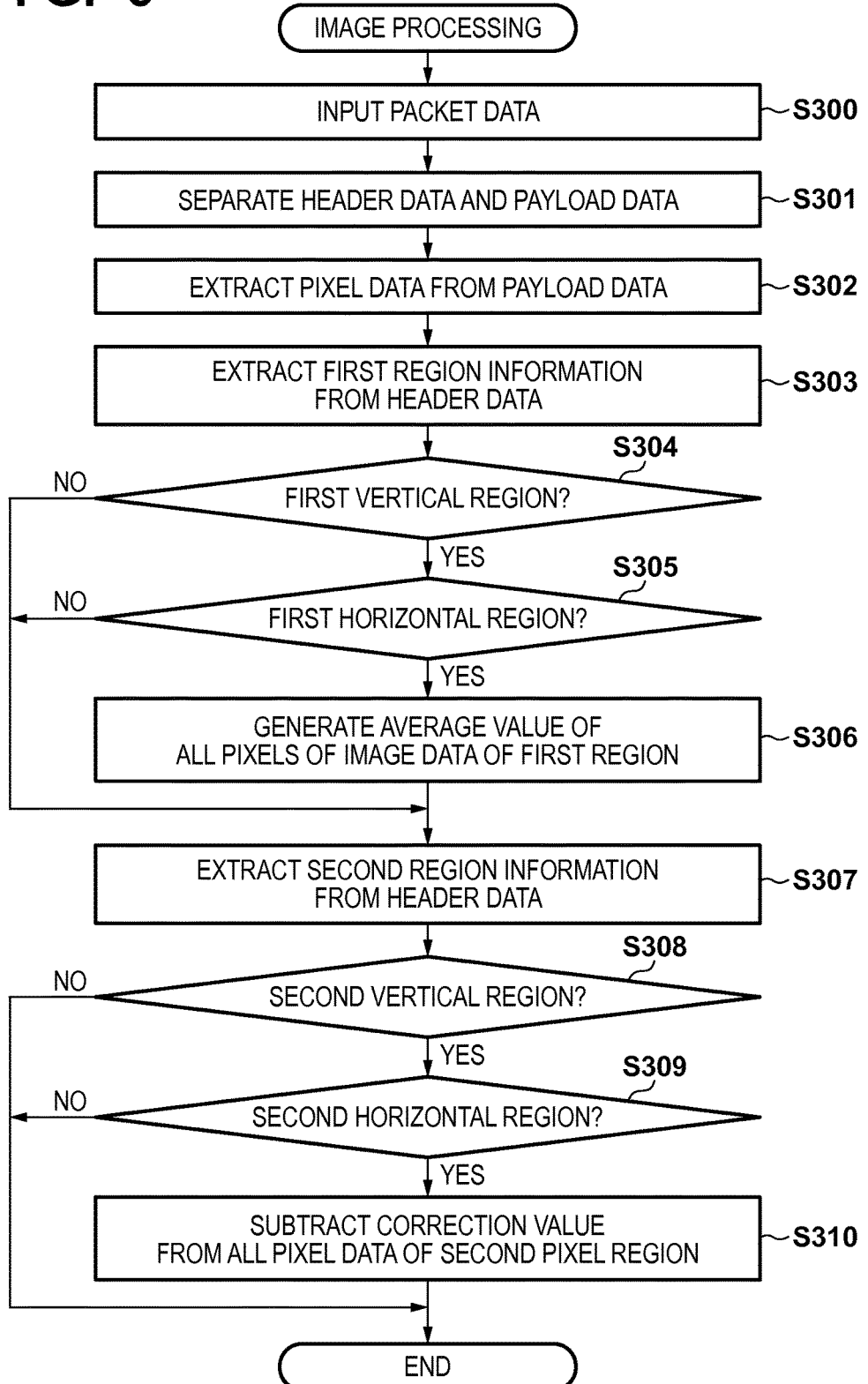
FIG. 6 is a flowchart for describing image processing according to the first embodiment.

The DFE 122 performs each process from step S300-step S305 as explained in FIG. 6.

Next, in step S901, the correction value calculation unit 303 calculates an average value for pixel data of each row when it is determined that a horizontal coordinate of pixel data is included in the first horizontal coordinate range. The correction value calculation unit 303 outputs to the pixel data processing unit 305 an average value for each calculated row as a correction value for correcting vertical direction shading due to an influence of dark current.

After this, each process from step S307-step S309 as explained in FIG. 6 is performed.

Also, in step S902, the pixel data processing unit 305 performs correction processing on pixel data of a row to be processed from the pixel data of the second pixel region using the correction values for each row calculated in step S901. The pixel data processing unit 305 corrects the shading in the vertical direction due to the influence of dark current on the image data by subtraction processing of a correction value from the pixel data of the second pixel region, for example.

As explained above, in embodiments, the DFE 122 is configured to calculate a correction value using pixels specified from out of the same row, and to perform correction processing therewith for pixel data of each row determined based on header information. With such a configuration, even in a case where the image sensor has an OB pixel region adjacent to the effective pixel region in a horizontal direction, the DFE 122, which is a circuit for signal processing, is able to perform image processing without receiving information relating to a vertical coordinate from the control unit 101. Accordingly, it is possible to reduce control information transmitted from the control unit to the circuit for signal processing.

Third Embodiment

Next, explanation will be given for a third embodiment. In the third embodiment, a horizontal coordinate range for the first and second pixel region is further input from the control unit 101 into the image sensor 121, and on this point the third embodiment differs from the embodiments described above. For this reason a configuration for generating header information of a packet, and a configuration for receiving the packet and calculating a correction value from the header information are different. Because other elements are the same as in the embodiments described above, the same reference numerals will be given to the same elements, overlapping explanation will be omitted, and predominantly explanation will be given for differences. Note that the image sensor in this embodiment is configured to have first and second pixel regions as shown in FIG. 10 in the second embodiment, and the DFE 122 performs processing for correcting shading in a vertical direction due to an influence of dark current similarly to the second embodiment.

Figure 11A:
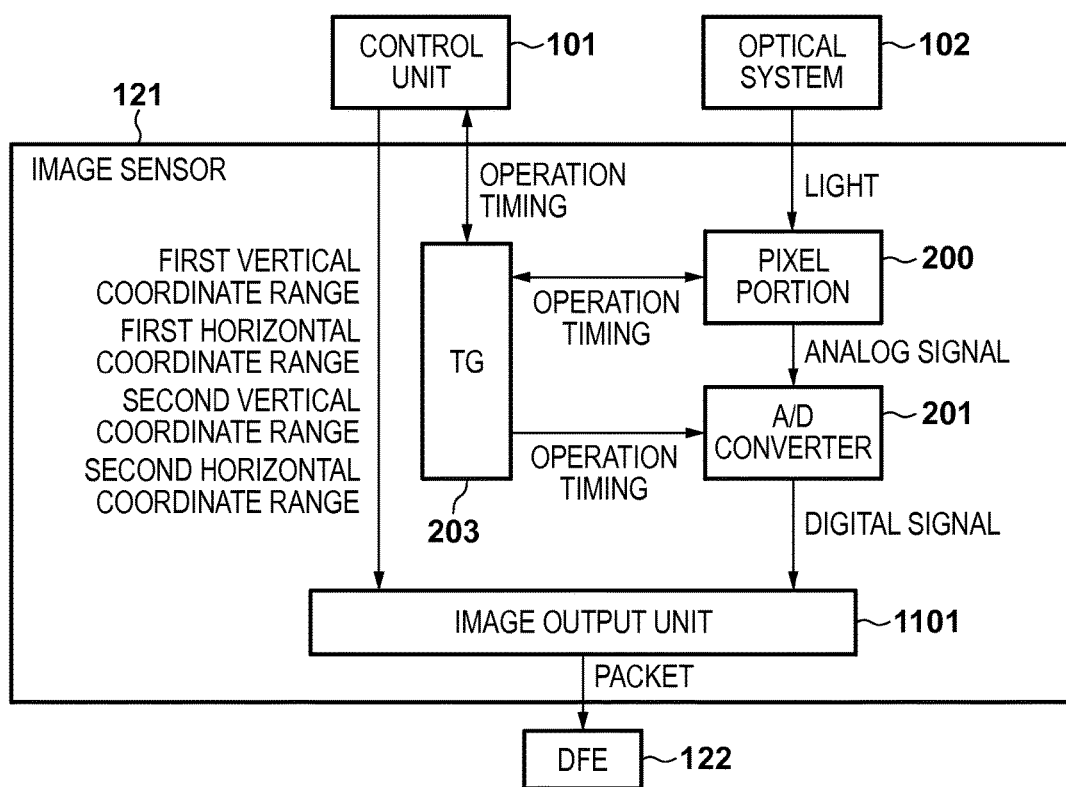
FIG. 11A is a block diagram for showing a functional configuration example of the image sensor according to a third embodiment.
Figure 11B:
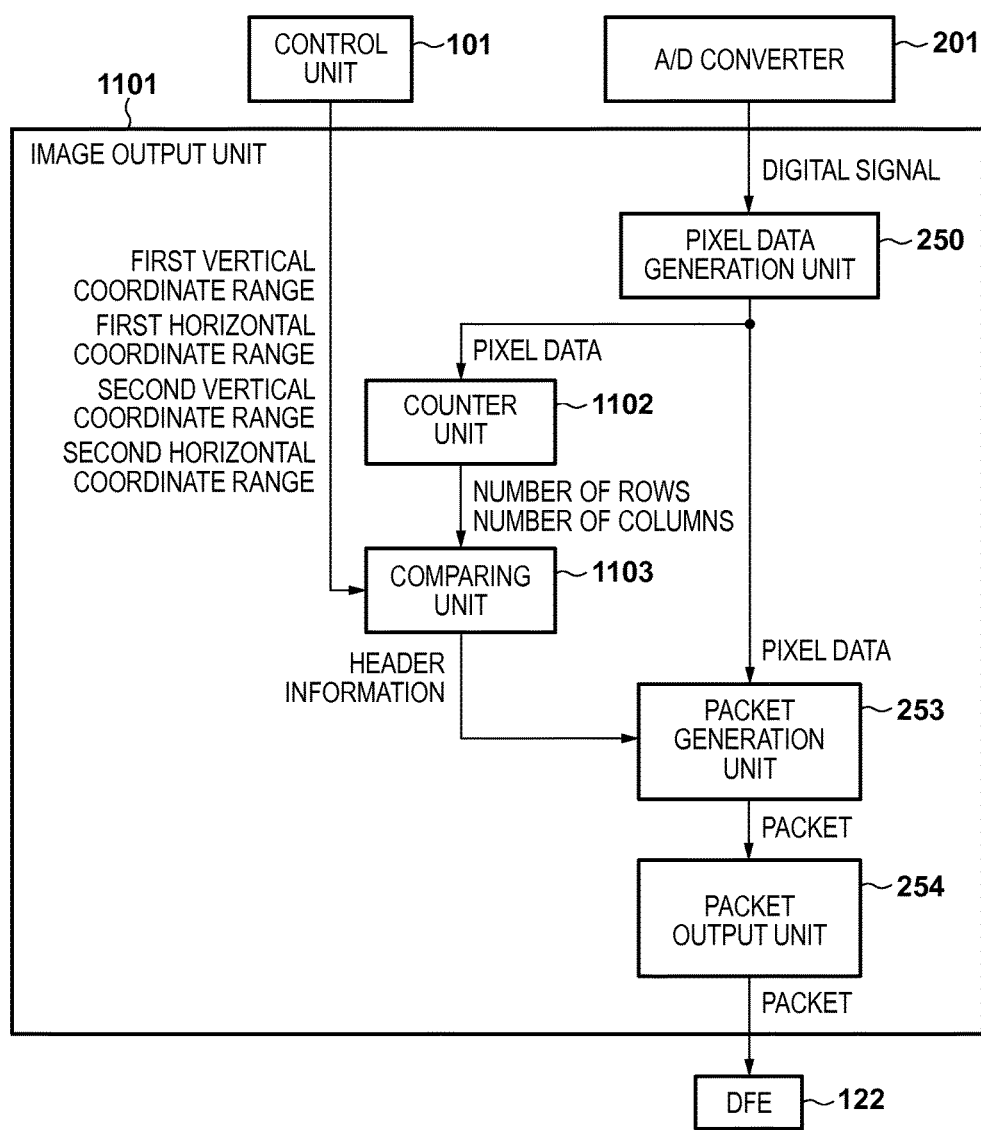
FIG. 11B is a block diagram for showing the image output unit according to the third embodiment.
Figure 13:
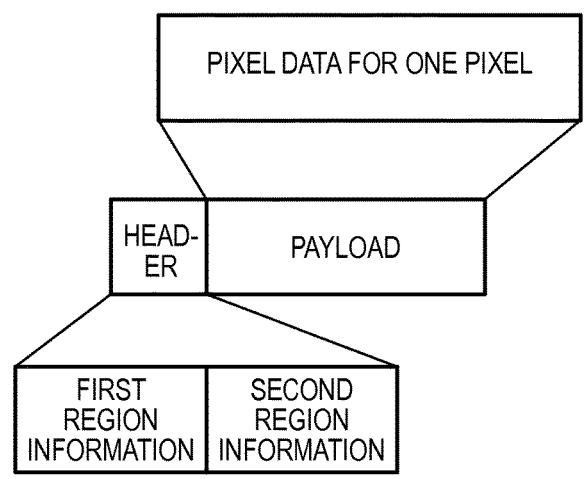
FIG. 13 is a view for illustrating an example of a packet format according to according to the third embodiment.

FIG. 11A illustrates a functional configuration example of the image sensor 121 in the present embodiment. In the above described embodiments, the image output unit 202 shown in FIG. 3 generates first region information from a first vertical coordinate range and a number of rows. In contrast to this, an image output unit 1101 according to the present embodiment inputs first and second horizontal coordinate ranges in addition to first and second vertical coordinate ranges from the control unit 101. FIG. 11B illustrates a functional configuration example of the image output unit 1101 according to embodiments. The image output unit 1101 generates first region information from a first vertical coordinate range, a first horizontal coordinate range, a number of rows and a number of columns of pixel data to be processed. Note that in the present embodiment, explanation is given for an example in which pixel data for one pixel is stored as a payload as shown in FIG. 13. However, configuration may be taken such that pixel data for one row is stored in the payload similarly to the above described embodiment, and a header indicating region information for each pixel stored in the payload is added.

A counter unit 1102 of the image output unit 1101 counts rows and columns for each pixel inputted for the pixel data inputted from the pixel data generation unit 250, and outputs the number of rows and columns of pixels to be processed to a comparing unit 1103. The comparing unit 1103 compares the counter value for the rows and columns input from the counter unit 1102 with coordinate ranges of the first and second pixel regions input from the control unit 101, and thereby generates header information. The comparing unit 1103 determines whether a counter value for the input rows is included in the first vertical coordinate range, and further determines if a counter value for the number of columns included in the first horizontal coordinate range. The comparing unit 1103 updates a value corresponding to the first region information when the column counter value is included in the first vertical coordinate range. Also, when the row counter value is included in the first horizontal coordinate range, the first region information is similarly updated. The first region information is a two digit binary identifier for which an initial value is set to 00, for example, and when each of the vertical coordinate and the horizontal coordinate in that order are included in the respective coordinate range a 1 is set. Accordingly, when the row counter value and the column counter value are included in the first pixel region, the first region information becomes 11. The comparing unit 1103 further generates second region information by determining whether the pixel data is included in the second pixel region. At this time, the comparing unit 1103 performs the generation of the second region information similarly to the generation of the first region information.

Figure 12:
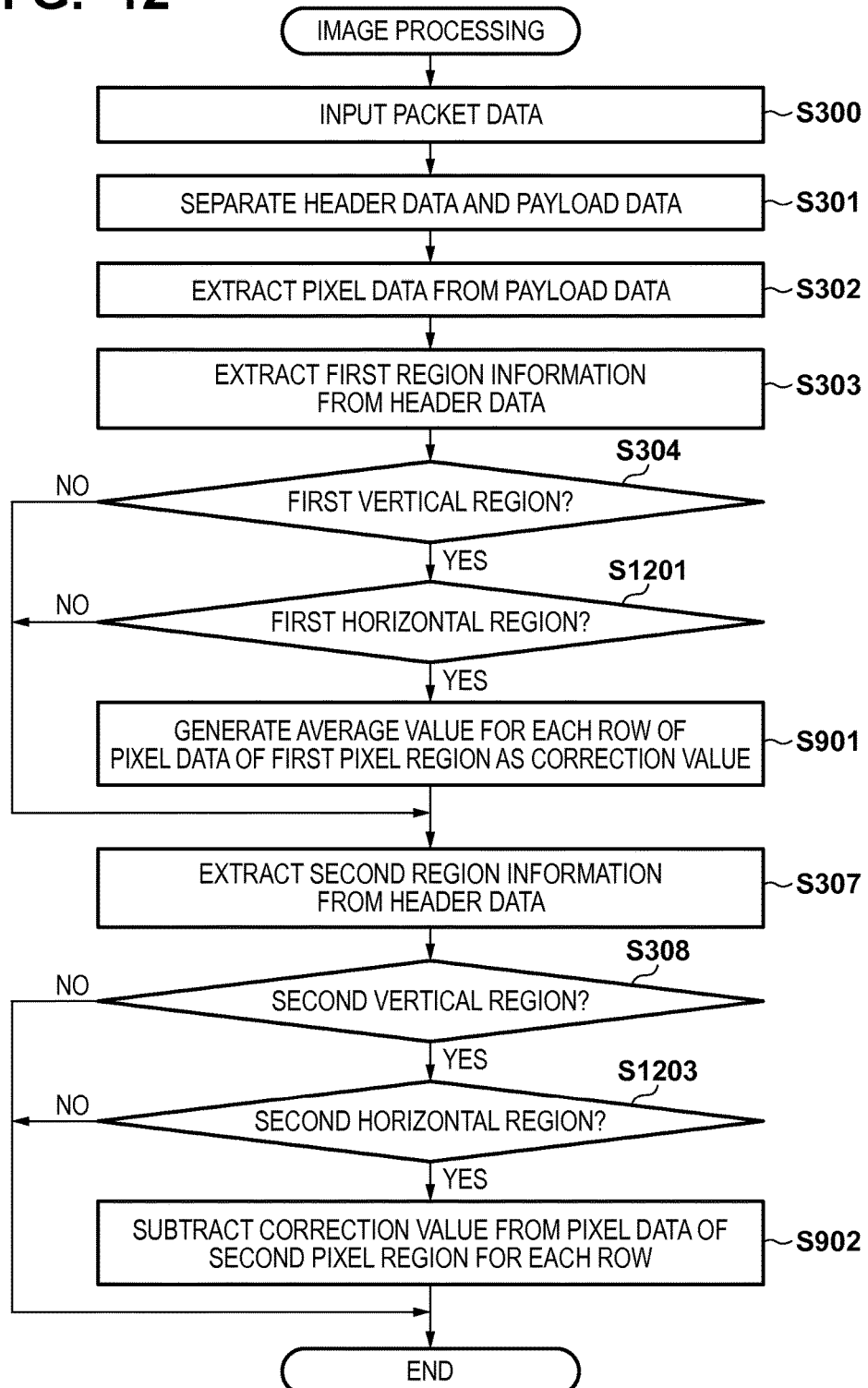
FIG. 12 is a flowchart for showing a series of operations in image processing according to the third embodiment.

Next, for a series of operations for image processing in embodiments, explanation will be given with reference to FIG. 12. Note that in FIG. 12 processing that is the same as in FIG. 6 or FIG. 9 is given the same step number.

The DFE 122 performs each process from step S300-step S304 as explained in FIG. 6.

Next, in step S1201, the correction value calculation unit 303 of the DFE 122 references the first region information, determines whether or not a horizontal coordinate of the pixel data is included in the first horizontal region, and when it is determined that the horizontal coordinate of the pixel data is included in the first horizontal region, advances the processing to step S901. More specifically, when, in the above described first region information, the value of the digit corresponding to the horizontal coordinate in the 2 digit identifier is 1, the correction value calculation unit 303 determines that the pixel data is included in the first horizontal region.

Figure 9:
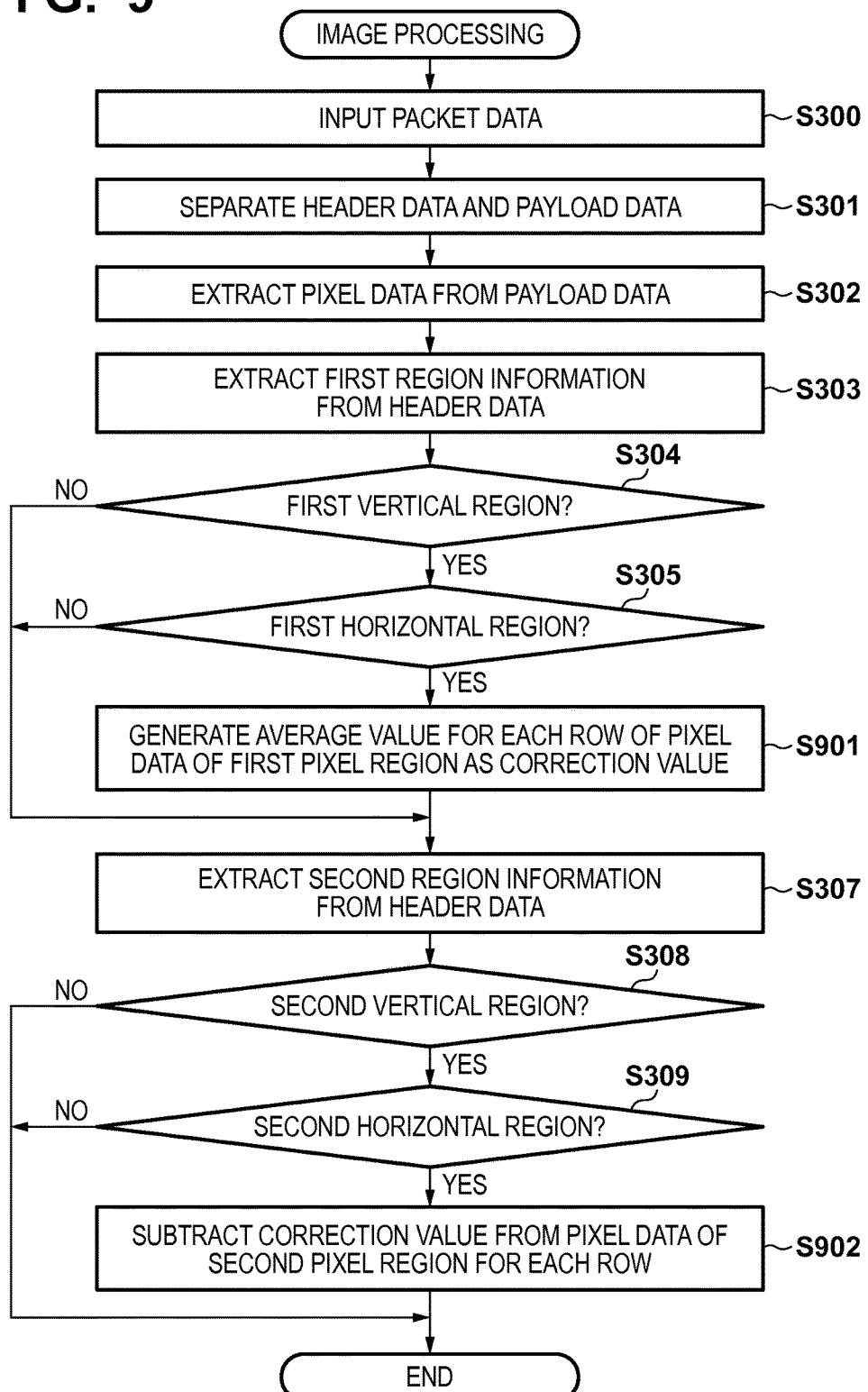
FIG. 9 is a flowchart for showing a series of operations in image processing according to a second embodiment.

After this, step S901 explained in FIG. 9, performs the processes of step S307-step S308 explained in FIG. 6.

Next, in step S1203, the correction value calculation unit 303 references the second region information, and determines whether a horizontal coordinate of the pixel data is included in the second horizontal region, and if the coordinate is determined to be included in the second horizontal region, the processing of step S902 explained in FIG. 9 is performed.

As explained above, in the present embodiment, vertical coordinate information and horizontal coordinate information of the pixel data is input into the image sensor 121, and the image sensor 121 supplies in a centralized fashion the vertical coordinate information and the horizontal coordinate information of the pixel data in addition to the pixel data. With such a configuration, the DFE 122, which is a circuit for signal processing, is able to perform image processing without receiving information relating to the vertical coordinate and the horizontal coordinate from the control unit 101, and thus it is possible to reduce control information for transmitting the circuit for signal processing from the control unit.

Other Embodiments

Figure 14A:
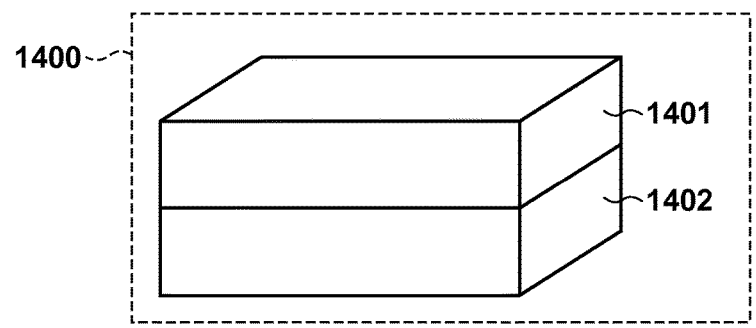
FIGS. 14A and 14B are views for showing examples of an image sensor of a stacked structure in accordance with other embodiments.
Figure 14B:
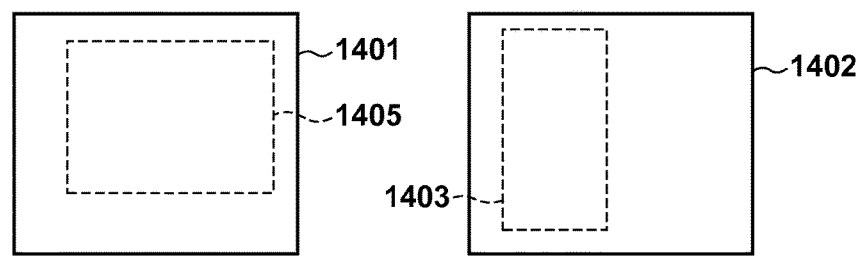

Also, the present invention can be applied to other embodiments shown below. For example, the present invention can be applied to an image sensor 1400 which is of a stacked structure as shown in FIG. 14A. As shown in FIG. 14A, in the image sensor 1400 of the present embodiment a first semiconductor chip 1401 and a second semiconductor chip 1402 are stacked at a chip level. FIG. 14A is an oblique projection view, and FIG. 14B illustrates a top view of each chip. A region including a pixel portion 1405 is included in the first semiconductor chip 1401, and a portion 1403 capable of high speed processing including digital data such as a column AD conversion circuit or a horizontal scanning circuit is included in the second semiconductor chip 1402 which is for high speed logic process. In the configuration of FIG. 1 described above, for example, the pixel portion 200 that the image sensor 121 comprises corresponds to the pixel portion 1405 of the first semiconductor chip 1401. Also, configuration may be taken such that circuits other than the pixel portion 200 and the image output unit 202 and the A/D converter 201 included in the image sensor 121 are arranged on the second semiconductor chip 1402.

Furthermore, the present invention can be applied to a mobile telephone 1500 shown in FIG. 15 which is an example of the image capturing apparatus. FIG. 15 is a block diagram for showing a functional configuration of the mobile telephone 1500. The mobile telephone 1500 comprises in addition to an audio call function, an electronic mail function, an Internet connection function, an image capturing and reproduction function, or the like. A communication unit 1010 communicates audio data, image data, or the like, with another telephone device by a communication scheme according to a communication carrier with which a user has made a contract. Upon an audio call, an audio processing unit 1020 converts audio data from a microphone 1030 into a format suited to transmission and sends the result to the communication unit 1010. Also, the audio processing unit 1020 decodes audio data from a call partner sent from the communication unit 1010 and sends the result to a speaker 1040. An image capturing unit 1050 captures an image of an object, and outputs pixel data. The image capturing unit 1050 includes the image sensor 121 described above in embodiments. Here, the image sensor 121 may be an image sensor of a stacked structure as described above. Also, the above described packet is transmitted between the image capturing unit 1050 and an image processing unit 1060. The image processing unit 1060 includes the DFE 122 described above in embodiments, and the image processing unit 1060 processes pixel data captured by the image capturing unit 1050 upon capturing of an image, converts the result into a format suitable for recording, and outputs the result. Also, the image processing unit 1060 processes a reproduced image upon reproduction of a recorded image, and sends the result to a display unit 1070. The display unit 1070 comprises a liquid crystal display panel of several inches, and displays various screens in accordance with instructions from a control unit 1090. A non-volatile memory 1080 stores address book information, electronic mail data, or the like, or data such as image data captured by the image capturing unit 1050.

The control unit 1090 has a CPU, a memory, or the like, controls each unit of the mobile telephone 1500 in accordance with a control program stored in a memory (not shown). An operation unit 1100 comprises various operation keys for the user to input data in addition to a power button, and number keys. A memory IF 1110 performs a recording reproduction of various data in a recording medium 1120, which may be a memory card, or the like. An external IF 1130 transmits data stored in the non-volatile memory 1080 and the recording medium 1120 to an external device, and receives data transmitted from an external device. The external IF 1130 performs communication by a wired connection communication scheme such as USB, or a publicly known communication scheme such as one for wireless communication.

Next, explanation is given of an audio call function in the mobile telephone 1500. When a call partner is called, a user inputs a number of the call partner by operating number keys of the operation unit 1100, or an address book stored in the non-volatile memory 1080 is displayed on the display unit 1070, a call partner is selected, and transmission is instructed. When the transmission is instructed, the control unit 1090 transmits to a call partner via the communication unit 1010. Upon an incoming call from a call partner, the communication unit 1010 outputs audio data of a partner to the audio processing unit 1020, and also transmits audio data of a user to the partner.

Also, when transmitting an electronic mail, a user instructs the generation of the mail using the operation unit 1100. When the generation of a mail is instructed, the control unit 1090 displays a screen for generating a mail on the display unit 1070. The user inputs a transmission destination address, a body, or the like, using the operation unit 1100, and instructs transmission. When a mail transmission is instructed, the control unit 1090 sends address information and mail body data to the communication unit 1010. The communication unit 1010 converts data of the mail into a format suitable for communication, and transmits the result to the transmission destination. Also, when the communication unit 1010 receives an electronic mail, the communication unit 1010 converts the received mail data into a format that is suited to display, and displays the result on the display unit 1070.

Next, explanation is given of a capturing function in the mobile telephone 1500. When capturing of a still image or a moving image is instructed, after a user sets an image capturing mode by operating the operation unit 1100, the image capturing unit 1050 captures still image data or moving image data, and sends it to the image processing unit 1060. The image processing unit 1060 processes the still image data or the moving image data that was captured, and stores the result in the non-volatile memory 1080. Also, the image processing unit 1060 sends the captured still image data, moving image data, or the like, to the memory IF 1110. The memory IF 1110 stores the still image data, or moving image data in the recording medium 1120.

Also, the mobile telephone 1500 is able to transmit a file including the captured still image, moving image data, or the like, as an electronic mail attachment file. Specifically, when an electronic mail is transmitted, an image file stored in the non-volatile memory 1080, the recording medium 1120, or the like, is selected, and transmission as an attachment file is instructed.

The mobile telephone 1500 can transmit files including captured still image or moving image data to an external device such as a PC, another telephone device, or the like, by the external IF 1130. The user selects an image file stored in the non-volatile memory 1080 or the recording medium 1120 and instructs transmission by operating the operation unit 1100. The control unit 1090 reads out the selected image file from the non-volatile memory 1080 or the recording medium 1120, and controls the external IF 1130 so as to transmit to the external device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-178508, filed Sep. 2, 2014, and Japanese Patent Application No. 2015-159137, filed Aug. 11, 2015, which are hereby incorporated by reference herein in their entirety.

What is claimed is:

1. An image capturing apparatus, comprising:
 a pixel portion comprising a first pixel region and a second pixel region;
 a a region information generator which generates region information indicating the first pixel region and the second pixel region based on coordinate information and a region of image data obtained from the pixel portion;
 a packet generating circuit which generates a packet by adding the region information to the image data; and
 a packet output circuit which outputs the packet; and
 a signal processor which corrects pixel data of the first pixel region using pixel data of the second pixel region for image data read out from the pixel portion,
 wherein the signal processor extracts pixel data of the first pixel region and pixel data of the second pixel region of the image data using the region information included in the packet.

2. The apparatus according to claim 1, wherein the signal processor comprises:
 an information extraction unit which extracts the region information from the packet;
 an extraction unit which extracts pixel data included in the first pixel region and the second pixel region from the pixel data obtained from the packet based on the region information; and
 a calculator which calculates a correction value for correcting pixel data included in the second pixel region using pixel data included in the first pixel region.

3. The apparatus according to claim 2, wherein the calculator calculates the correction value based on an average value of pixel data of pixels specified by the region information from pixels of the second pixel region.

4. The apparatus according to claim 2, wherein the signal processor comprises a correction unit which corrects an output of a pixel of the second pixel region by subtracting the correction value from pixel data of a pixel specified by the region information from pixels of the first pixel region.

5. The apparatus according to claim 1, wherein the region information includes information of at least one of a vertical coordinate range of each region or a horizontal coordinate range of each region, wherein the information is for specifying a pixel of the first pixel region and a pixel of the second pixel region.

6. The apparatus according to claim 1, wherein the packet generating circuit divides the image data by a predetermined pixel data size, and adds the region information to the divided image data as header information.

7. The apparatus according to claim 1, wherein a pixel of the first pixel region is a pixel of an effective pixel region, and a pixel of the second pixel region is a pixel for correcting an output of a pixel of the effective pixel region.

8. The apparatus according to claim 1, wherein a pixel of the second pixel region is a pixel of a light-shielded region.

9. The apparatus according to claim 1, wherein the pixel portion is included in an image sensor of a stacked structure in which a plurality of semiconductor chips are stacked.

10. An image capturing apparatus in accordance with claim 1, wherein the region information generator compares coordinate information and the region of image data obtained from the pixel region to generate region information.

11. An image sensor comprising:
 a pixel portion comprising a first pixel region and a second pixel region;
 a region information generator which generates region information indicating the first pixel region and the second pixel region based on coordinate information and a region of image data obtained from the pixel portion;
 a packet generating circuit which generates a packet by adding the region information to the image data; and
 a packet output circuit which outputs the packet.

12. The image sensor according to claim 11, wherein the region information includes information of at least one of a vertical coordinate range of each region or a horizontal coordinate range or each region, wherein the information is for specifying a pixel of the first pixel region and a pixel of the second pixel region.

13. The image sensor according to claim 11, wherein the packet generating circuit divides the image data by a predetermined pixel data size, and adds the region information to the divided image data as header information.

14. The image sensor according to claim 11, wherein a pixel of the first pixel region is a pixel of an effective pixel region, and a pixel of the second pixel region is a pixel for correcting an output of a pixel of the effective pixel region.

15. The image sensor according to claim 11, wherein a pixel of the second pixel region is a pixel of a light-shielded region.

16. The image sensor according to claim 11, wherein the image sensor is an image sensor of a stacked structure in which a plurality of semiconductor chips are stacked.

17. An image sensor in accordance with claim 11, wherein the region information generator compares coordinate information and the region of image data obtained from the pixel region to generate region information.

18. A control method of an image capturing apparatus in which a pixel portion has a first pixel region and a second pixel region, the method having:
 a region information generating step of generating region information indicating the first pixel region and the second pixel region based on coordinate information and a region of image data obtained from the pixel portion;

a packet generating step of generating a packet by adding the region information to the image data;

a packet output step of outputting the packet; and a signal processing step of correcting pixel data of the first pixel region using pixel data of the second pixel region for image data read out from the pixel portion, wherein in the signal processing step, pixel data of the first pixel region and pixel data of the second pixel region of the image data is extracted using the region information included in the packet.

19. A control method in accordance with claim 18, wherein the region information generating step comprises comparing coordinate information and the region of image data obtained from the pixel region to generate region information.

* * * * *